Patented Apr. 7, 1936

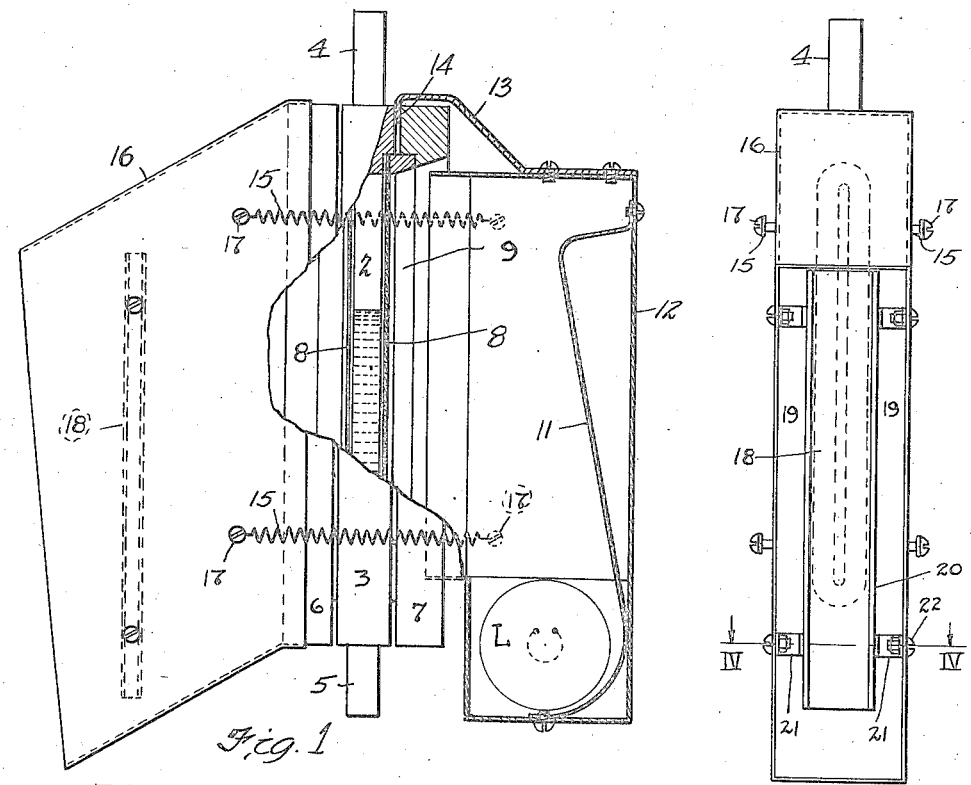
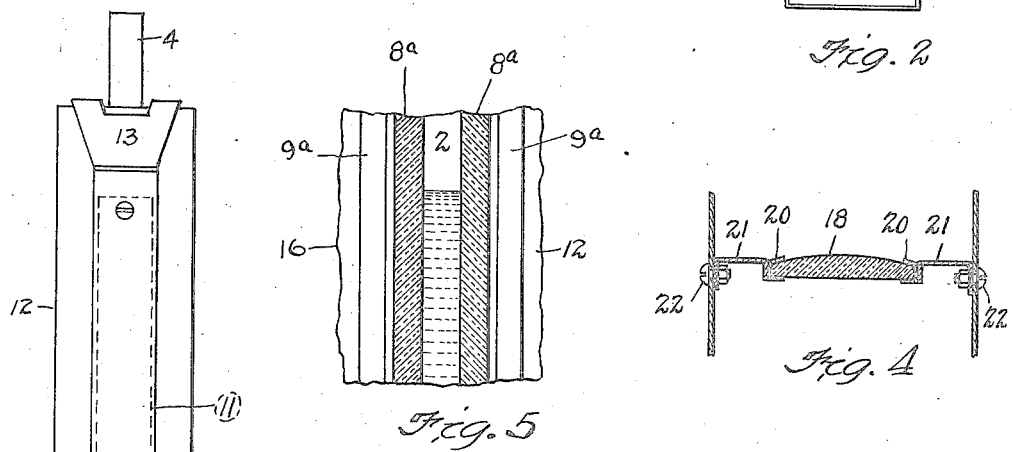
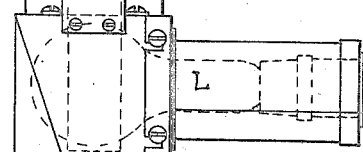

2,036,777

UNITED STATES PATENT OFFICE 2,036,777

ILLUMINATED LIQUID LEVEL GAUGE

Gearold E. Sams, Cleveland, Ohio, assignor to The Reliance Gauge Column Company, Cleveland, Ohio, a corporation of Ohio Application June 10, 1933, Serial No. 675,245

14 Claims. (Cl. 240—2.15)

Where liquid level gauges have to be mounted at some distance above the floor, the matter of accurate visibility offers more or less difficulty, and in high pressure boiler usage gauge-glass blow-out hazards have handicapped efforts at effective combining of illuminating means. In accordance with the present invention however, a gauge of accurate visibility becomes possible, and without extended hazards of damage from blow-outs.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:—

Fig. 1 is a side elevational view, partly in section, showing an embodiment of the invention; Fig. 2 is a front elevation thereof; Fig. 3 is a rear elevation; Fig. 4 is a sectional detail taken on a plane indicated substantially by line IV—IV, Fig. 2; and Fig. 5 is a fragmentary view corresponding to the sectional portion of the gauge as shown in Fig. 1.

Referring more particularly to the drawing, there is shown a gauge having a liquid-holding chamber 2, and while the precise detail of the chamber and transparent covers therefor may vary, conveniently it may comprise a slotted chamber 3 having connections 4, 5, for attachment to a water column or other arrangement as desired, and having clamping members 6, 7, securing non-shatterable transparent plates, preferably mica sheets 8 as cover plates for the liquid-holding chamber, such covers being backed by slotted backing members 9 which may be suitably beveled back from the slot-opening. Associated in convenient relation is a source of light, as an incandescent lamp L, and by positioning this out of direct line with the liquid-holding chamber, and preferably in a recessed pocket, direct damage to the lamp in the event of a blow-out is minimized. To insure adequate distribution of the light, a reflector II with suitable angular placement may be arranged above the light, the assembly being held in a hood section 12, suitably held to the face of the liquid-holding chamber. For this, a holding lug 13 shaped to project forwardly and terminate in spaced hook-ends 14, may be conveniently clamped between the gauge members 3 and 7.

By forming the holding lug 13 of slightly resilient sheet metal, the hood-section 12 may suitably yield in the event of a blow-out of the gauge. As further conducive to such end, yieldable assembly-means, as springs 15, may be arranged to hold the hood-section 12 and the hood-section 16 in relation with the gauge members, lugs or suitable projections 17 on each section facilitating the hooking on of the assembly-springs. The hood-section 16, which is to face the observer, carries a magnifying glass 18. Instead of incorporating this as a part of the slot-cover I preferably provide a mounting such as to minimize damage-hazard in the event of a gauge blowout. By spacing the magnifier out from the gauge slot, and providing also side passageways 19 between the magnifier and the hood 16, ample exit-way for pressure-fluid is had, even in the event of a blow-out, and corresponding safety for the magnifier results. The magnifying glass desirably, is such as to present convexity across one or both faces, the degree thereof being uniform up the height of the column. A convenient mounting means for the magnifier may comprise channel-members 20 such as to suitably firmly hold the glass, brackets 21 thence extending to the side walls of the hood 16, being suitably secured thereto, for instance by bolts 22.

Instead of the non-shatterable transparent slot-cover construction aforementioned, the assemblage may be made up as indicated in Fig. 5, with the slot having glass cover plates 8a, these being held by backing members 9a, and having the hood sections 12, 16 in relation as described in the foregoing.

With the gauge thus constructed, the rays of light are projected from the lamp L in part directly, and in part by reflection from the reflector surface 11, through the liquid-holding chamber 2, and the magnifier 18 by enlarging the visible slot to the extent desired, affords a clear cut visibility for the liquid level meniscus to an observer positioned in sight-line of the hood-section 16. Even in the event of blow-out, the clearance-way relative to the magnifier mounting is such as to minimize chances of damage. Besides, the yieldable assembly-means allows the hood-sections to harmlessly swing apart.

Other modes of applying the principle of the invention may be employed, change being made as regards the details described, provided the means stated in any of the following claims, or the equivalent of such, be employed.

I therefore particularly point out and distinctly claim as my invention:—

1. A liquid level gauge, comprising a liquid-holding chamber, means for lighting the same, a lens in sight-line before said chamber, and a skeleton-mounting for supporting said lens without presenting lateral obstruction along its edges.

2. A liquid level gauge, comprising a liquid-holding chamber, non-shattering transparent face plates therefor, means for lighting the chamber, a lens in sight-line before said chamber, skeleton-supports holding said lens without presenting lateral obstruction along its edges, and a hood inclined down forwardly and containing said lens.

3. A liquid level gauge, comprising a liquid-holding chamber, a lens in sight-line before said chamber, means for holding said lens with explosion-vent spacing intervening between the lens and liquid-holding chamber, hood-means at the front of the liquid-holding chamber covering said lens, light-controlling hood-means at the rear of said chamber, and explosion-yieldable means for holding the front and rear hood-means in assembly with the liquid-holding chamber.

4. A liquid level gauge, comprising a liquid-holding chamber, non-shattering transparent face plates therefor, means including a rear hood-section for lighting the chamber, a magnifying lens in sight-line before said chamber, a front hood-means for said chamber and covering said lens and being inclined down forwardly, and explosion-yieldable means for controlling said hood-means in position with the chamber.

5. A liquid level gauge, comprising a liquid-holding chamber, means for lighting the same, a lens in sight-line before said chamber, a hood containing said lens and brackets for holding said lens spaced from the hood and the liquid-holding chamber.

6. A liquid level gauge, comprising a liquid-holding chamber, non-shattering transparent face plates therefor, a lens in sight-line before said chamber, means for holding said lens spaced with an explosion-vent spacing intervening between the lens and liquid-holding chamber, and a lamp below the level of the face plates for lighting said chamber.

7. A liquid level gauge, comprising a liquid-holding chamber, means for lighting said chamber, a lens in sight-line before said chamber, a skeleton-mounting for supporting said lens without presenting lateral obstruction along its edges, a hood covering said lens, and explosion-yielding means for holding said lens-hood in assembly with the liquid-holding chamber.

8. A liquid level gauge, comprising a liquid-holding chamber, means for lighting the same, a rear light-controlling hood-section, a front hood-section for directing the line of vision into the common plane of the liquid-holding chamber and the lighting means, and springs for yieldably holding said sections together in assembly with said chamber.

9. A liquid level gauge, comprising a liquid-holding chamber, means for lighting said chamber, a magnifying lens in sight-line before said chamber, front and rear hood-sections, the magnifying lens being in the front section and the lighting means in the rear section, and means for yieldably holding said sections in assembly with said chamber.

10. A liquid level gauge, comprising a liquid-holding chamber, non-shattering transparent face plates therefor, means for lighting the chamber, a hood-section at the front for facilitating viewing of the liquid-holding chamber, another hood-section at the rear of said chamber for providing light for the liquid-holding chamber, springs for yieldably holding said sections in assembly with said chamber, a lens in sight-line before said chamber, and means for holding said lens with clearance-space in said front hood-section.

11. A liquid level gauge, comprising a liquid-holding chamber, front and rear hood-sections, springs for yieldably holding said sections in assembly with said chamber, a lamp mounted in a lower recess in said rear hood-section, a magnifying lens in sight-line before said chamber, and means for holding said magnifying lens with clearance-space in said front hood-section.

12. A liquid level gauge, comprising a liquid-holding chamber, means for lighting the same, a magnifying lens in sight-line before said chamber, brackets mounting said lens with clearance at its sides, a rear hood-section carrying said lighting means, and a slightly resilient lug holding said hood-section to the liquid chamber.

13. A liquid level gauge, comprising a liquid-holding chamber, a rear hood-section for providing light for said liquid-holding chamber, a slightly resilient lug for holding said hood-section to the liquid chamber, a lamp below the line of said liquid chamber, a reflector above said lamp, a front hood-section for facilitating viewing of the liquid-holding chamber, and means for yieldably holding said front section.

14. A liquid level gauge, comprising a liquid-holding chamber, a rear hood-section, a slightly resilient lug for holding said hood-section to the liquid chamber, a lamp by the lower portion of said liquid chamber, a reflector above said lamp, a front hood-section, a magnifying lens in sight-line before said liquid chamber, means for mounting said magnifying lens with clearance in said front hood-section, and resilient means for holding the front section to the rear section.

GEAROLD E. SAMS.